(12) United States Patent
Minato et al.

(10) Patent No.: US 6,260,973 B1
(45) Date of Patent: Jul. 17, 2001

(54) PROJECTOR

(75) Inventors: Shoichi Minato, Sakai; Hideki Nagata, Kobe, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/277,692

(22) Filed: Mar. 26, 1999

(30) Foreign Application Priority Data

Mar. 27, 1998 (JP) .................................................. 10-081963

(51) Int. Cl.$^7$ ................................................. G03B 21/14
(52) U.S. Cl. .............................................. 353/42; 353/122
(58) Field of Search ............................... 353/42, 101, 122, 353/98; 345/158, 180, 182, 183, 25; 348/745, 806

(56) References Cited

U.S. PATENT DOCUMENTS

| | | | |
|---|---|---|---|
| 5,235,363 | * 8/1993 | Vogeley et al. | 353/122 |
| 5,422,693 | * 6/1995 | Vogeley et al. | 353/122 |
| 5,572,251 | * 11/1996 | Ogawa | 348/744 |
| 5,738,429 | * 4/1998 | Tagawa et al. | 353/42 |
| 5,883,476 | * 3/1999 | Noguchi et al. | 348/745 |
| 5,898,465 | * 4/1999 | Kawashima et al. | 348/745 |

FOREIGN PATENT DOCUMENTS

| | | |
|---|---|---|
| 8-320921 | 12/1996 | (JP) . |
| 8-331667 | 12/1996 | (JP) . |
| 9-80372 | 3/1997 | (JP) . |
| 10-40006 | 2/1998 | (JP) . |

* cited by examiner

*Primary Examiner*—William Dowling
(74) *Attorney, Agent, or Firm*—Sidley & Austin

(57) ABSTRACT

The present invention is a projector having a photosensing means for detecting light entering the optical system from outside the optical system, wherein the photosensing means is capable of detecting only the light reflected from within a predetermined area on the screen. According to one aspect, the projector of the present invention includes a linear CCD as a photosensing means resulting in a long, thin area on a screen being detectable by the photosensing means.

25 Claims, 5 Drawing Sheets

PROJECTOR

This application is based on Japanese Patent Application No. HEI 10-81963, the content of which is hereby incorporated by reference.

FIELD OF THE INVENTION

The present invention relates to a projector for projecting an image on a screen. In one aspect, the present invention relates to a projector capable of detecting light, emitted from outside the projector, at a predetermined position on a screen.

BACKGROUND OF THE INVENTION

A projector provided with charge-coupled devices (CCD) within an optical system has been proposed. When a position is indicated on a screen using a laser pointer during the projection of an image on the screen, the laser light is reflected by the screen, travels in a direction opposite to that of the projected light, and enters the optical system of the projector. In such projectors, the CCD detects the laser light so that the indicated position on the screen can be determined.

For example, a window area, having items such as screen frame forward, frame back, etc., can be displayed along with an internet page or an image photographed with a digital camera. When a desired item is specified by the laser pointer, the specified position on the screen is detected by the projector, and a corresponding frame forward or frame back operation is performed. Further, not only can detecting a specified position trigger an operation, it is also possible to fetch an image corresponding to an area specified by the laser pointer.

When using an area CCD as a photosensing means in a conventional projector, the detection area of the reflected light extends over the entire screen, and extensive data processing is required for detection when an area CCD is used. Furthermore, an area CCD is expensive an adds an unnecessary cost to the device.

The laser pointers conventionally used for indicating a position on a screen illuminate the screen with the laser light. Since laser light is harmful when it enters the human eye, extreme care must be taken by anyone using a laser pointer so that the laser light does not stray off the screen inadvertently.

SUMMARY OF THE INVENTION

An object of the present invention is to provide a projector capable of detecting only the light reflected from within a predetermined area on a screen.

Another object of the present invention is to provide a projector capable of specifying a position without using laser light and detecting the specified position.

According to one aspect, the present invention attains these objects by providing a projector having a photosensing means for detecting light entering the optical system from outside the optical system, wherein the photosensing means is capable of detecting only the light reflected from within a predetermined area on the screen.

According to another aspect, the projector of the present invention includes a linear CCD as a photosensing means resulting in a long, thin area on a screen being detectable by the photosensing means.

According to a further aspect, the projector of the present invention projects an image on a screen, and has a pointing image display means for displaying a pointing image on a screen which specifies a position within the image, photosensing means for detecting the specified position, and spectral means for separating the image light received from the pointing image display means into spectral components so as to direct the spectral components to the photosensing means.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
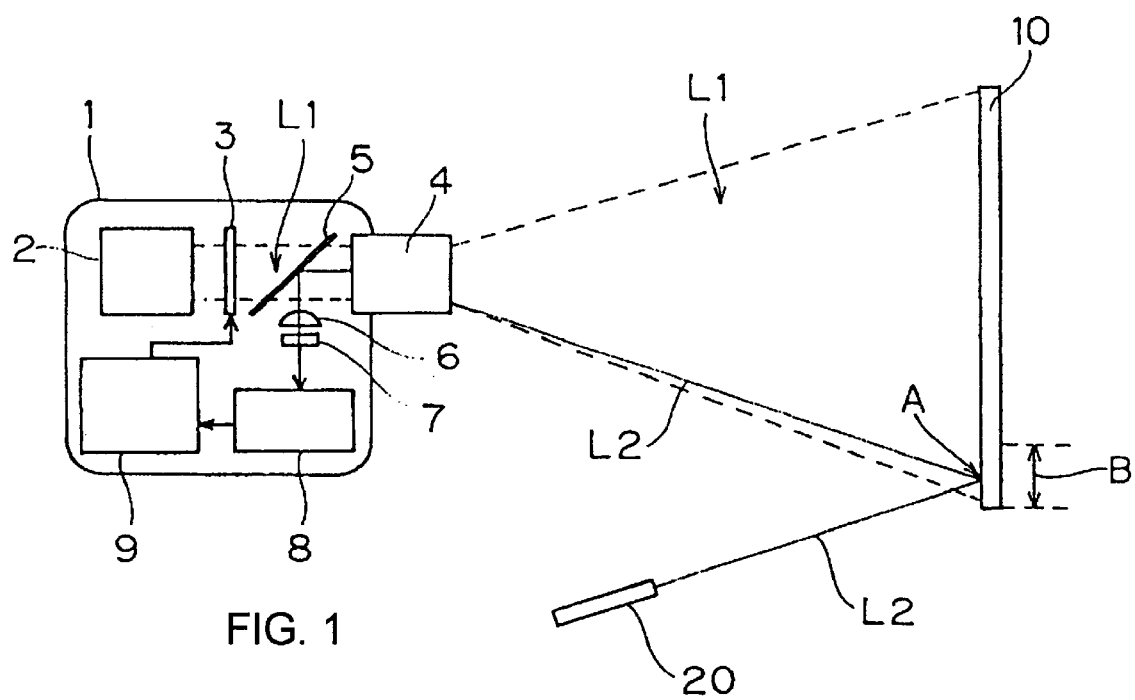
FIG. 1 is a schematic view of a projector of a first embodiment of the present invention.

The embodiments of the present invention are described hereinafter with reference to the accompanying drawings. FIG. 1 shows the construction of a first embodiment of the projector of the present invention. In the drawings, like parts and constructions are designated by like reference numbers, and duplicate descriptions are omitted. In the projector 1, a light L1 emitted from a light source 2 is modulated by a liquid crystal panel 3, transmitted through a projection lens 4, and projected onto a screen 10.

The laser light L2 emitted from a laser pointer 20 illuminates a position A on the screen 10 to specify an area. The laser light L2 is reflected by the screen 10, and enters the optical system of the projector 1. The entered laser light L2 is polarized by a polarization beam splitter 5, and passes through a condenser lens 6 to enter a linear CCD 7. Then, the laser light L2, which illuminated the position A on the screen 10, is detected by a sensor 8.

The linear CCD 7 is provided as a photosensing means in the projector 1 of the present embodiment. The linear CCD 7 detects the light reflected from within the area B on the screen 10.

Figure 2:
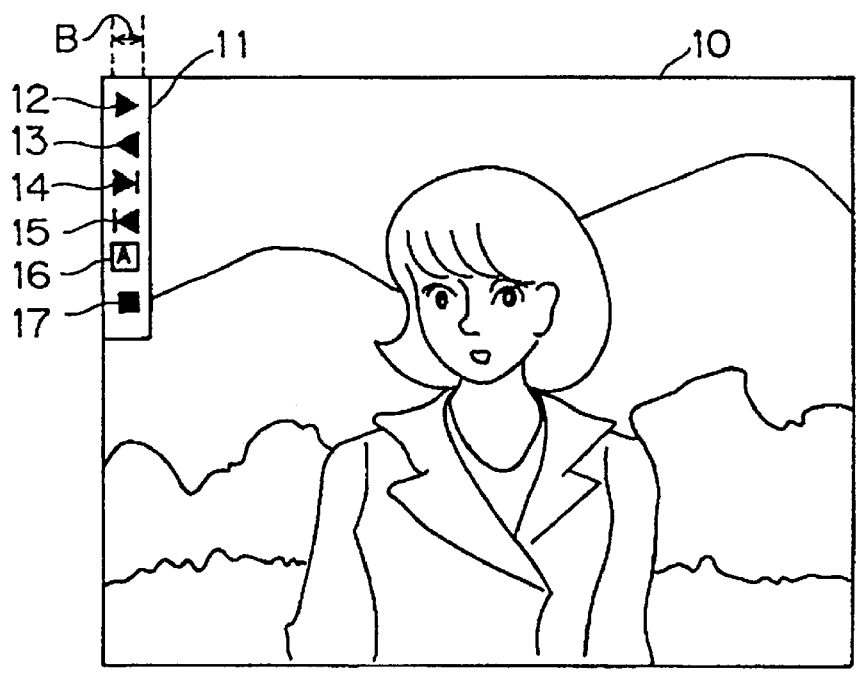
FIG. 2 is a view of an image projected by the projector of the first embodiment of the present invention.

FIG. 2 shows an image projected by the projector 1. This drawing shows the projection of an image photographed by a digital camera and shows the image of a window area 11 displayed in the upper left corner of the screen in combination with the photographic image. Items numbered 12 through 17 are displayed within the window area 11, and include various operations listed from the top, including "next" 12, "back" 13, "last" 14, "first" 15, "auto play" 16, and "stop" 17. The area B of the window area 11 is the detectable area of the linear CCD 7.

When the laser pointer 20 illuminates the item "next" 12 in the window 11, the light reflected from item 12 enters the optical system of the projector 1, and is detected by the linear CCD 7. Then, the position illuminated by the laser light L2 is determined as a position corresponding to the item "next" 12 by the sensor 8 and a command is outputted to change the projection image on the screen 10 to the next frame. This output command is received by an LCD drive controller 9 which controls the liquid crystal panel 3 to display the next frame image on the screen 10.

Since the area specified for illumination by the laser light L2 (i.e., items 12 through 17 of window 11) is determined beforehand, the image layout can be set such that this area forms a line-like area on the screen, and the light reflected by this area can be detected by linear CCD 7.

Unlike conventional projectors, the use of an expensive area CCD is unnecessary, thereby allowing an inexpensive projector to the produced. Furthermore, because the area to be illuminated by the laser light L2 is a long, thin line-like area corresponding to the linear CCD 7, this line-like area can be arranged along the lateral edge of the image so as to not obstruct other areas of the image.

Figure 3:
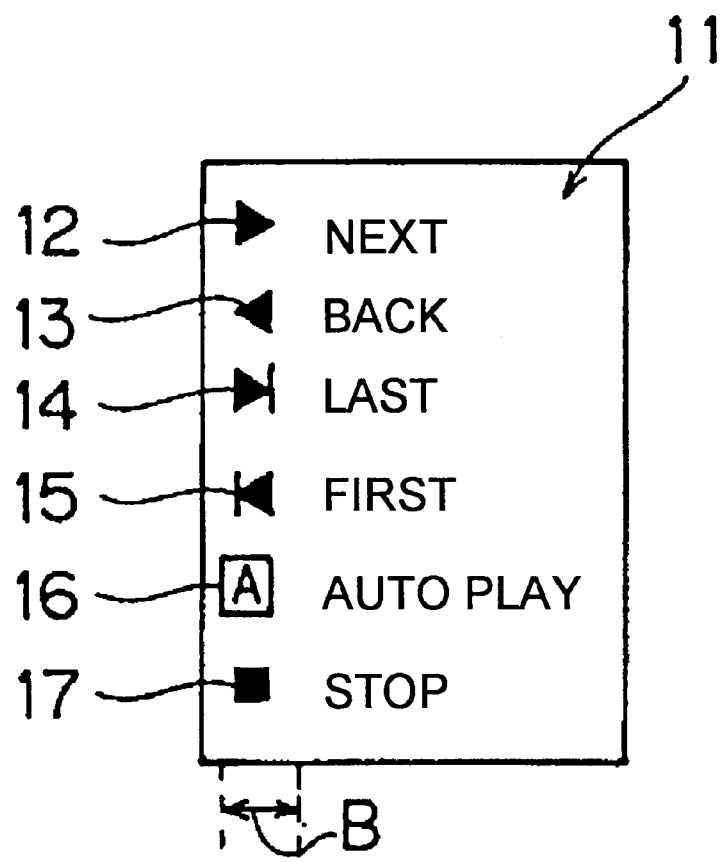
FIG. 3 is a view of another example of a window area according to the present invention.

The form of the window area 11 is not limited to the form described in FIG. 2. Another example of the window area 11 is shown in FIG. 3, wherein items 12 through 17 in window 11 are text items describing the operations including "next" 12, "back" 13, "last" 14, "first" 15, "auto play" 16, and "stop" 17. In this instance, area B alone corresponds to the photosensing area of the linear CCD 7.

Window 11 may be projected at a position adjacent to the projected image, and need not be combined with the projected image as in the previously described embodiment.

Furthermore, in general, the illumination shape of the laser pointer 20 may be adjusted from a point to a line. When the position illuminated by laser light is detected by linear CCD 7 as in the present embodiment, a line-like illumination shape of the light of laser pointer 20 can be more readily detected by linear CCD 7 than a spot-like illumination since the photosensing area is a long, thin line-like area.

Figure 4:
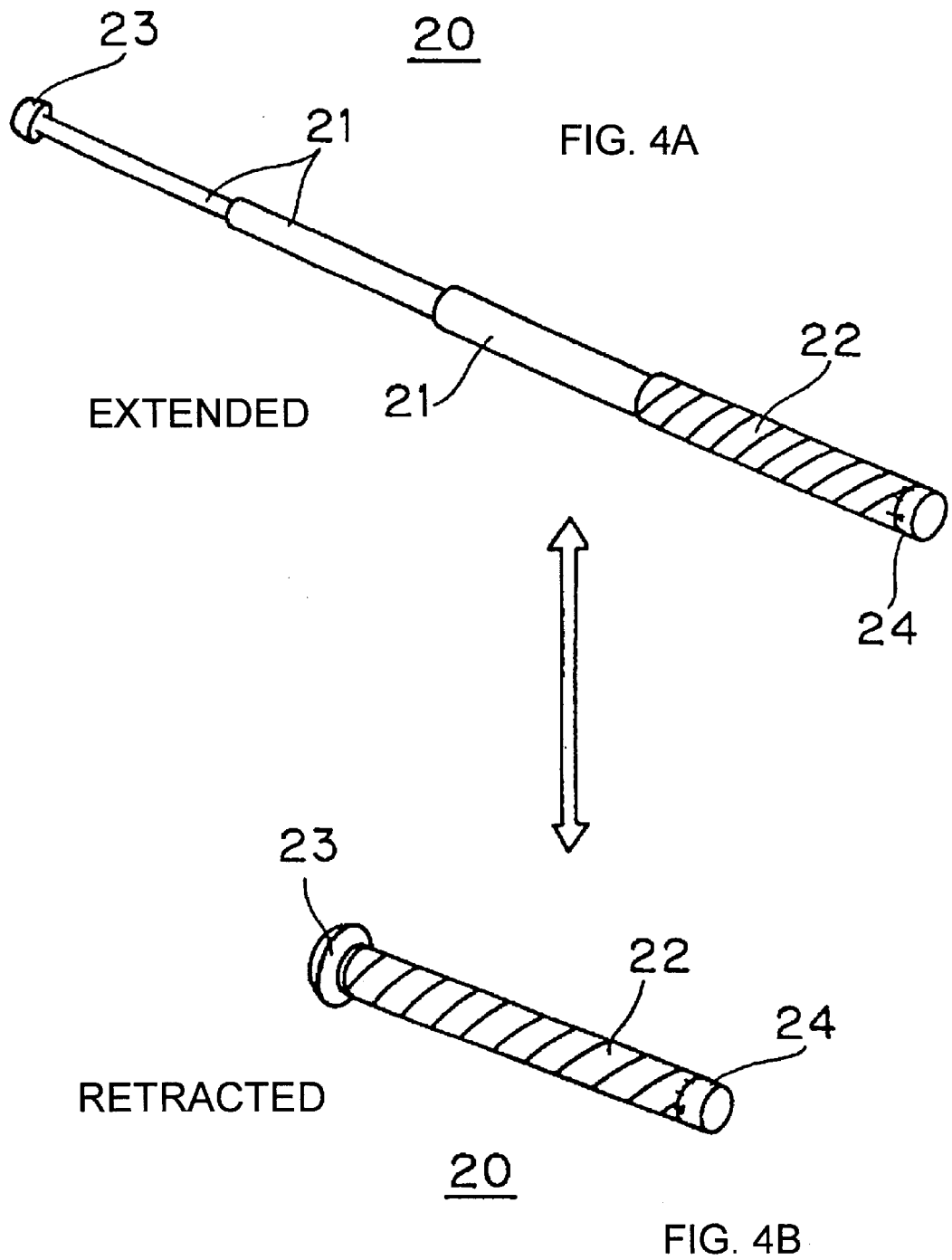
FIG. 4A is a pictorial view of a laser pointer, which has been extended.
FIG. 4B is a pictorial view of a laser pointer, which has been retracted.

An example of the laser pointer 20 having a laser illumination shape, which is adjustable from a point to a line, is described below. As shown in FIGS. 4A and 4B, the laser pointer 20 comprises a plurality of rods 21 of different thicknesses.

When the grip 22 is held and the light emitting tip 23 is pulled from the retracted state, each rod 21 slides out in extension. A light source and a collimator lens for collimating the light emitted form the light source are built into the light emitting unit 23, and laser light is emitted from an emission window (not illustrated) in the tip of the light emitting unit 23. A rotary switch 24 is provided on the end of the grip section 22.

When the rotary switch 24 is rotated, the light source can be switchably turned ON and OFF. The light emitting unit 23 and the rotary switch 24 of the grip section 22 are electrically connected through the interior of each rod 21, and this electrical connection is maintained even when the rods 21 slide in extension. The light source is switched ON/OFF by operating the rotary switch 24. The power source may be, for example, built into the grip section 22, or power may be supplied externally.

The distance between the light source and the collimator lens changes and the illumination shape of the emitted laser light can be switched between point-like and line-like by switching the rotary switch 24. Changing the distance between the light source and the collimator lens may be accomplished by moving the light source in the optical axis direction, or moving the collimator lens in the optical axis direction. These movements may be accomplished electrically or mechanically.

An operation unit for switching the light source ON/OFF and switching the illumination shape of the light may be provided at the tip of the laser pointer 20. In this instance, the internal construction may be simplified so that the relative positions of the operation unit and the light source do not change even when the laser pointer 20 is extended.

With regard to the aforesaid laser pointer 20, not only can laser light be emitted to specify an area on the screen, the tip (light emitting unit 23) may make direct contact with the screen to indicate an area by extending the pointer 20. For example, when using the projector for a presentation at a conference and the like, an area may be specified using the laser light, or the laser pointer 20 may be used to directly indicate an area, thereby improving the effectiveness of the presentation.

Figure 5:
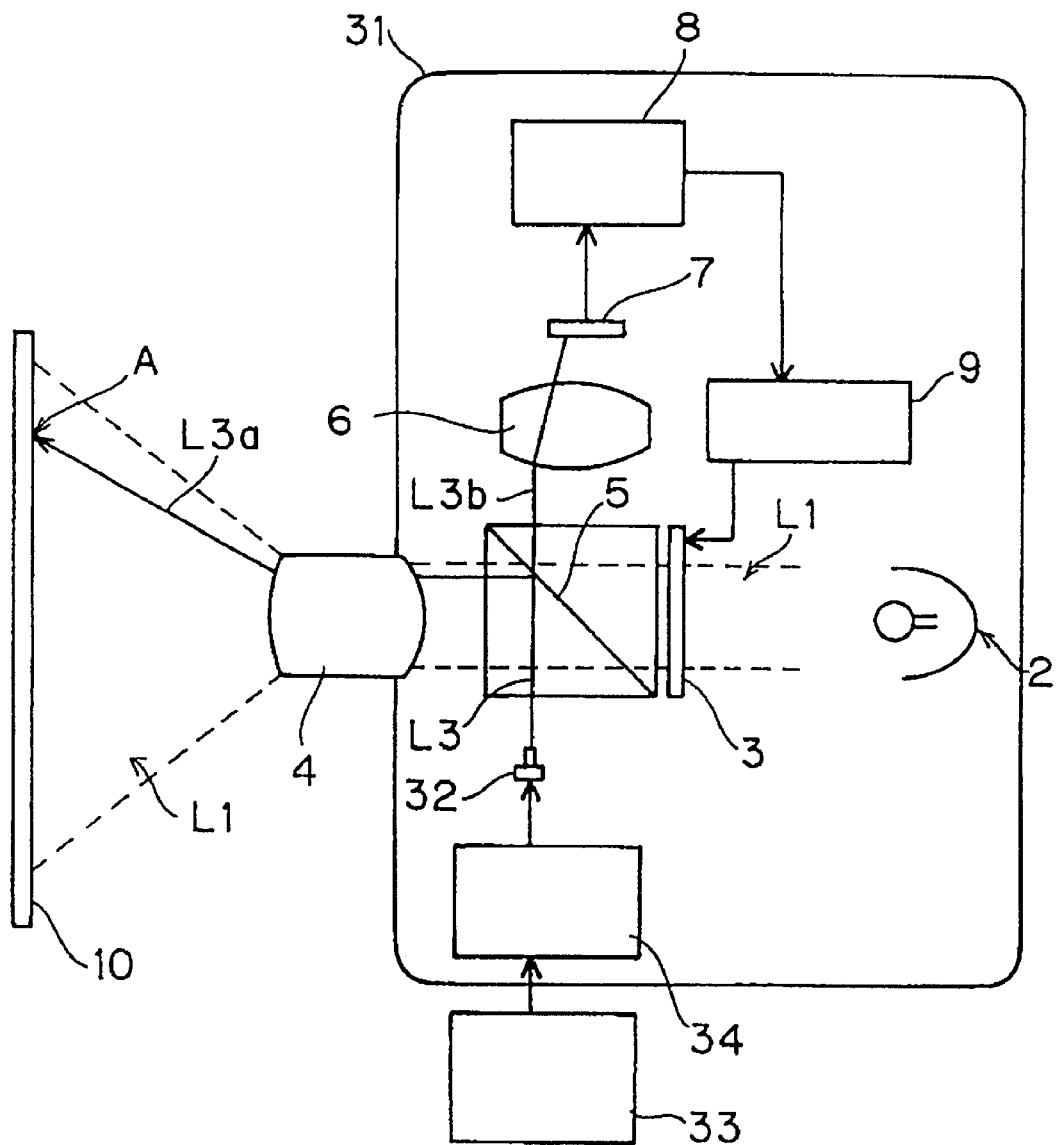
FIG. 5 is a schematic view of a projector of a second embodiment of the present invention.

A second embodiment of the present invention is described below with reference to FIG. 5. The light L1, emitted by the light source 2, is modulated by the liquid crystal panel 3 and transmitted through a polarization beam splitter 5, formed of a film having 90% transmittance, and the projection lens 4, so as to be projected onto the screen 10. Illumination light L3, emitted from an LED 32, enters the polarization beam splitter 5 from a different direction than the light L1, which is emitted by the light source 2.

Part of the split light L3a is polarized by the polarization beam splitter 5 so as to advance in the same direction as the light L1 and be projected onto the screen 10. This projected image forms a pointing image for specifying position A on the screen 10. Another part of the split light L3b is transmitted through the polarization beam splitter 5 and condenser lens 6, and enters the linear CCD 7. In this way, the sensor unit 8 can detect the illumination position A of the light L3a on the screen 10.

The illumination position A of the light L3a is movable across the entire surface of the screen 10 by the operation unit 33. That is, when a user operates the operation unit 33, the LED drive controller 34 moves the LED 32 along a plane perpendicular to the optical axis in accordance with the operation of the operation unit 33. The operation unit 33 may not only be simply operated by a user, it may also be operated, for example, by a joystick or the like which performs the operation via a lever.

The projector of the second embodiment is capable of detecting the illumination position A of the LED 32 on the screen 10 similar to the first embodiment. Since an area on the screen 10 can be specified by the light L3, there is no chance of exposure to a human eye to the illumination light. Furthermore, there is no chance of injury to a human eye since laser light is not used.

The photosensing means 7 comprises an area CCD in the second embodiment since the LED 32 moves along a plane perpendicular to the optical axis. However, the movement of the LED 32 is not limited to a straight line perpendicular to the optical axis and, therefore, the photosensing means 7 may comprise a linear CCD insofar as there is a determined area for projecting the pointing image for executing frame advancement and the like on the screen 10, as in the first embodiment.

Figure 6A:
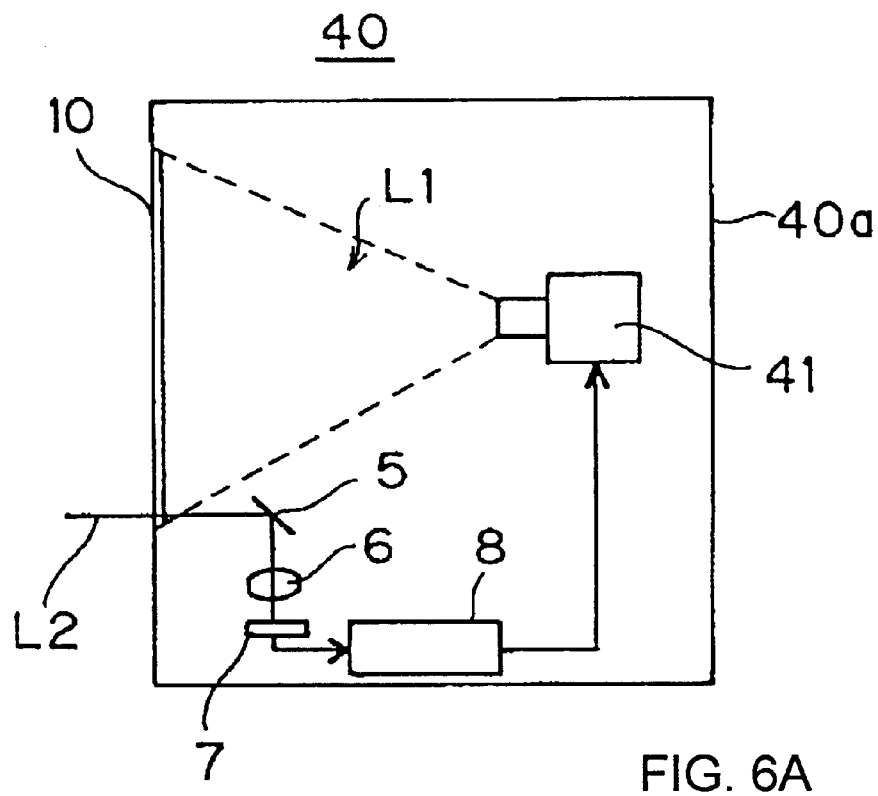
FIG. 6A is a schematic view of another embodiment of the projector of the present invention.
Figure 6B:
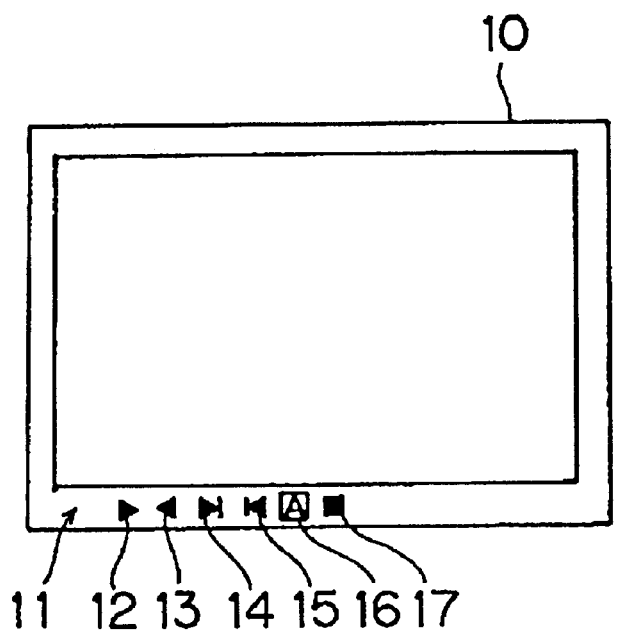
FIG. 6B is a view of an image projected by the projector of FIG. 6A.

Next, another embodiment relating to a rear projection type projector is described with reference to FIG. 6. The rear projector 40 projects an image from behind the screen 10. A projector 41 is provided within a body 40a, and the screen 10 is disposed in front of the body 40a. This projector 41 differs from the projectors of the first and second embodiments in that it is only provided with an optical system for projecting an image.

A window 11 is formed within the predetermined edge area around the periphery of an image projected on the screen 10, and the normal image is displayed in the center of the screen 10. The items 12 through 17 are displayed in this window 11, and these items 12 through 17 are identical to the items in the first embodiment shown in FIG. 2.

When the laser light L2 emitted by the laser pointer 20 (not shown) illuminates the items 12 through 17 in the window 11 from the front of the screen 10, the brightness of the illumination position on the screen 10 changes. The image on the back side of the window 11 is reflected by a reflecting mirror 5, provided behind the screen 10, and this reflected light is projected through the condenser lens 6 onto the linear CCD 7. The sensing unit 8 detects the illumination position A of the laser light L2 on the screen 10. In this instance, a linear CCD can be used as the CCD 7 because the items 12 through 17 of window 11 are provided on the peripheral edge of the screen 10.

A linear CCD 7 may be used as the photosensing means because the area of illumination by the laser light L2 is limited beforehand as in the first embodiment.

The present invention has been described by way of examples of detecting a specified position on a screen as a trigger for operations such as next frame and previous frame of the screen image in the aforesaid embodiments and the embodiment of the rear projector. It is to be understood, however, that the application of data of the detected specification position is not limited, and it is possible, for example, to retrieve the image of the specified position for output to an external device.

Although the present invention has been described with reference to a presently preferred embodiment, it will be appreciated by those skilled in the art that various modifications, alternatives, variations, etc., may be made without departing from the spirit and scope of the invention as defined in the appended claims.

What is claimed is:

1. A projector comprising:
   a projecting device for projecting an image; and
   a sensor for detecting light only in a fixed, predetermined area of said image,
   wherein the predetermined area is smaller than the image.

2. A projector, as claimed in claim 1, wherein said sensor is a linear charge-coupled device.

3. A projector, as claimed in claim 1, wherein said projecting device projects the image on a screen and said light is light which is reflected from within said predetermined area of the screen.

4. A projector, as claimed in claim 1, wherein said projecting device projects the image on a screen and said light is light which passes through said predetermined area of the screen.

5. A projector, as claimed in claim 1, further comprising a controller for controlling said projecting device based upon an output of said sensor.

6. A projector, as claimed in claim 1, further comprising a polarization beam splitter, said polarization beam splitter being disposed within a light path of said projecting device.

7. A projector, as claimed in claim 6, wherein said sensor detects light which is polarized in a predetermined direction.

8. A projector comprising:
   a projecting device for projecting an image and a pointing image; and
   a sensor for detecting light only in a fixed, predetermined area of said image,
   wherein said pointing image is projected within said predetermined area and said predetermined area is smaller than said image.

9. A projector, as claimed in claim 8, wherein said sensor is a linear charge-coupled device.

10. A projector, as claimed in claim 8, wherein said projecting device projects the image on a screen and said light is light which is reflected from within said predetermined area of the screen.

11. A projector, as claimed in claim 8, wherein said projecting device projects the image on a screen and said light is light which passes through said predetermined area of the screen.

12. A projector, as claimed in claim 8, further comprising a controller for controlling said projecting device based upon an output of said sensor.

13. A projector, as claimed in claim 8, further comprising a polarization beam splitter, said polarization beam splitter being disposed within a light path of said projecting device.

14. A projector, as claimed in claim 13, wherein said sensor detects light which is polarized in a predetermined direction.

15. A projector control device comprising:
   a sensor for detecting light only in a fixed, predetermined area of a projected image, the predetermined area being smaller than the projected image; and
   a controller for controlling the projector based upon an output of said sensor.

16. A projector control device, as claimed in claim 15, wherein said sensor is a linear charge-coupled device.

17. A projector comprising:
   a projecting device for projecting an image along a first light path;
   a light emitting device for emitting a pointing light along a second light path;
   a beam splitter for splitting said pointing light into a first portion, which is directed along said first light path, and a second portion, which is directed along a third light path; and
   a sensing device for detecting said second portion of said pointing light.

18. A projector, according to claim 17, said projecting device comprising:
   a light source for providing light along said first light path;
   a liquid crystal panel for modulating light from said light source; and
   a panel controller for controlling said liquid crystal panel based upon, at least in part, an output of said sensing device.

19. A projector, according to claim 17, said light emitting device comprising:
   a light emitting diode for emitting said pointing light along said second path;
   a pointing controller for controlling a position of said light emitting diode with respect to said second light path; and
   an operation unit for controlling said pointing controller based upon an input of an operator.

20. A projector, according to claim 19, wherein said pointing controller i s capable of controlling said position of said light emitting diode in a plane which is perpendicular to said second light path.

21. A projector, according to claim 17, wherein said beam splitter is a polarization beam splitter.

22. A projector, according to claim 17, further comprising a condenser lens, wherein said second portion of said pointing light is transmitted through said condenser lens along said third light path.

23. A projector, according to claim 17, wherein said sensing device comprises:

a linear charge coupled device for detecting said second portion of said pointing light; and a sensor unit for determining a projected position of said pointing light and outputting said projected position of said pointing light to said panel controller.

24. A projector, according to claim 17, wherein said sensing device detects light which is polarized in a predetermined direction.

25. A projector, according to claim 17, wherein said projector is capable of projecting said image onto a screen and projecting said pointing light as a pointing image onto said screen.

* * * * *